(12) United States Patent
Martinez et al.

(10) Patent No.: US 9,897,811 B2
(45) Date of Patent: Feb. 20, 2018

(54) CURVED EYEPIECE WITH COLOR CORRECTION FOR HEAD WEARABLE DISPLAY

(71) Applicant: Google Inc., Mountain View, CA (US)

(72) Inventors: Oscar A. Martinez, Mountain View, CA (US); Ozan Cakmakci, Sunnyvale, CA (US); James C. Dunphy, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/093,227

(22) Filed: Apr. 7, 2016

(65) Prior Publication Data
US 2017/0293143 A1 Oct. 12, 2017

(51) Int. Cl.
*G02B 27/01* (2006.01)
*F21V 8/00* (2006.01)
*G02B 27/28* (2006.01)

(52) U.S. Cl.
CPC ........ *G02B 27/0172* (2013.01); *G02B 6/0025* (2013.01); *G02B 27/01* (2013.01);
(Continued)

(58) Field of Classification Search
CPC ............................ G02B 27/0172; G02B 27/01; G02B 27/0101; G02B 27/017; G02B 27/0176;
(Continued)

(56) References Cited

U.S. PATENT DOCUMENTS

| 5,880,888 A | 3/1999 | Schoenmakers et al. |
| 5,886,822 A | 3/1999 | Spitzer |

(Continued)

FOREIGN PATENT DOCUMENTS

| DE | 102010041343 A1 | 3/2012 |
| JP | 2001066543 A | 8/2001 |

(Continued)

OTHER PUBLICATIONS

U.S. Appl. No. 15/093,235—See-Through Curved Eyepiece With Patterned Optical Combiner, filed Apr. 7, 2016, 23 pages.
(Continued)

*Primary Examiner* — William R Alexander

(57) ABSTRACT

An apparatus for use with a head wearable display includes a curved eyepiece for guiding display light to a viewing region offset from a peripheral location and emitting the display light along an eye-ward direction in the viewing region. The curved eyepiece includes a curved lightguide to guide the display light, an eye-ward facing surface that is concave, a world facing surface that is convex and opposite the eye-ward facing surface, and an optical combiner disposed at the viewing region to redirect the display light towards the eye-ward direction for output from the curved lightguide. The optical combiner is partially transmissive to ambient light incident through the world facing surface such that the viewing region is see-through. In some embodiments, a prism is disposed proximate to the input surface to pre-compensate the display light for lateral chromatic aberrations resulting the curved lightguide.

18 Claims, 5 Drawing Sheets

(52) U.S. Cl.
CPC ....... *G02B 27/0176* (2013.01); *G02B 27/286* (2013.01); *G02B 2027/011* (2013.01); *G02B 2027/013* (2013.01); *G02B 2027/0116* (2013.01); *G02B 2027/0125* (2013.01); *G02B 2027/0154* (2013.01); *G02B 2027/0159* (2013.01); *G02B 2027/0178* (2013.01); *G02B 2027/0194* (2013.01)

(58) Field of Classification Search
CPC .......... G02B 27/286; G02B 2027/0125; G02B 2027/013; G02B 2027/0178; G02B 6/00; G02B 6/003; G02B 6/0025
USPC ........................................ 359/631, 629, 630
See application file for complete search history.

(56) References Cited

U.S. PATENT DOCUMENTS

| | | | |
|---|---|---|---|
| 6,091,546 A | 7/2000 | Spitzer | |
| 6,094,241 A | 7/2000 | Yamazaki | |
| 6,204,974 B1* | 3/2001 | Spitzer | G02C 7/086 359/630 |
| 6,384,982 B1 | 5/2002 | Spitzer | |
| 6,760,169 B2 | 7/2004 | Takahashi et al. | |
| 6,825,987 B2 | 11/2004 | Repetto et al. | |
| 6,879,443 B2 | 4/2005 | Spitzer et al. | |
| 6,961,162 B2 | 11/2005 | Nakamura et al. | |
| 6,987,620 B2* | 1/2006 | Nagaoka | G02B 27/0172 345/8 |
| 7,057,814 B2 | 6/2006 | Boyd et al. | |
| 7,242,527 B2 | 7/2007 | Spitzer et al. | |
| 7,411,637 B2 | 8/2008 | Weiss | |
| 7,542,209 B2 | 6/2009 | McGuire, Jr. | |
| 7,724,443 B2 | 5/2010 | Amitai | |
| 7,800,827 B2* | 9/2010 | Moliton | G02B 6/10 264/1.1 |
| 7,944,616 B2 | 5/2011 | Mukawa | |
| 8,004,765 B2 | 8/2011 | Amitai | |
| 8,212,859 B2 | 7/2012 | Tang et al. | |
| 8,471,967 B2 | 6/2013 | Miao et al. | |
| 8,488,246 B2 | 7/2013 | Border et al. | |
| 8,639,072 B2 | 1/2014 | Popovich et al. | |
| 8,665,178 B1 | 3/2014 | Wang | |
| 8,810,913 B2 | 8/2014 | Simmonds et al. | |
| 8,830,569 B2 | 9/2014 | Filipovich et al. | |
| 8,837,880 B2* | 9/2014 | Takeda | G02B 6/0006 385/15 |
| 8,848,289 B2 | 9/2014 | Amirparviz et al. | |
| 8,964,298 B2 | 2/2015 | Haddick et al. | |
| 8,970,962 B2 | 3/2015 | Filipovich et al. | |
| 8,989,535 B2 | 3/2015 | Robbins | |
| 9,013,793 B2 | 4/2015 | Gupta et al. | |
| 9,366,869 B2 | 6/2016 | Martinez et al. | |
| 2002/0063913 A1* | 5/2002 | Nakamura | G02B 27/017 359/15 |
| 2004/0085649 A1* | 5/2004 | Repetto | G02B 27/0172 359/633 |
| 2007/0070859 A1* | 3/2007 | Hirayama | G02B 5/32 369/112.04 |
| 2008/0025667 A1* | 1/2008 | Amitai | G02B 6/0028 385/36 |
| 2009/0122414 A1 | 5/2009 | Amitai | |
| 2010/0046070 A1 | 2/2010 | Mukawa | |
| 2010/0149073 A1 | 6/2010 | Chaum et al. | |
| 2011/0149201 A1 | 6/2011 | Powell et al. | |
| 2011/0193814 A1 | 8/2011 | Gay et al. | |
| 2011/0213664 A1 | 9/2011 | Osterhout et al. | |
| 2012/0001833 A1* | 1/2012 | Lindig | G02B 27/017 345/8 |
| 2012/0002294 A1* | 1/2012 | Dobschal | G02B 27/0172 359/630 |
| 2012/0062998 A1* | 3/2012 | Schultz | B29D 11/00663 359/630 |
| 2012/0162549 A1 | 6/2012 | Gao et al. | |
| 2012/0212398 A1 | 8/2012 | Border et al. | |
| 2013/0016292 A1 | 1/2013 | Miao et al. | |
| 2014/0063055 A1 | 3/2014 | Osterhout et al. | |
| 2014/0126052 A1* | 5/2014 | Amitai | G02B 6/0035 359/485.01 |
| 2014/0140653 A1 | 5/2014 | Brown et al. | |
| 2014/0140654 A1 | 5/2014 | Brown et al. | |
| 2014/0226215 A1 | 8/2014 | Komatsu et al. | |
| 2015/0062716 A1 | 3/2015 | Komatsu et al. | |
| 2015/0177519 A1 | 6/2015 | Cakmakci et al. | |
| 2015/0248158 A1 | 9/2015 | Schowengerdt | |
| 2015/0260992 A1* | 9/2015 | Luttmann | G02B 27/0172 359/631 |
| 2016/0034032 A1 | 2/2016 | Jeong | |
| 2016/0357016 A1* | 12/2016 | Cakmakci | H04N 5/33 |
| 2017/0010465 A1* | 1/2017 | Martinez | G02B 27/0172 |
| 2017/0045744 A1* | 2/2017 | Amitai | G02B 27/0172 |

FOREIGN PATENT DOCUMENTS

| | | |
|---|---|---|
| WO | WO 2013/112705 A1 | 8/2013 |
| WO | WO 2013/175465 A1 | 11/2013 |

OTHER PUBLICATIONS

Cakmakci, O.—Head-Worn Displays: A Review, Journal of Display Technology, issued Sep. 2006, 18 pages.
Rolland, J. et al.—Head-Worn Displays: The Future Through New Eyes, Optics & Photonics News, issued Apr. 2009, 8 pages.
Cakmakci, O. et al.—U.S. Appl. No. 14/139,277, Eyepiece for Head Wearable Display Using Partial and Total Internal Reflections, filed Dec. 23, 2013, 21 pages.
Martinez, O. et al.—U.S. Appl. No. 14/537,780, Thin Curved Eyepiece for See-Through Head Wearable Display, filed Nov. 10, 2014, 23 pages.
Cakmakci, O. et al.—U.S. Appl. No. 14/730,983, Efficient Thin Curved Eyepiece for See-Through Head Wearable Display, filed Jun. 4, 2015, 24 pages.
Martinez, O. et al.—U.S. Appl. No. 14/792,084, Adding Prescriptive Correction to Eyepieces for See-Through Head Wearable Displays, filed Jul. 6, 2015, 27 pages.
Cakmakci, O. et al.—U.S. Appl. No. 14/949,114, Curved See-Through Eyepiece Having a Tiled Field of View, filed Nov. 23, 2015, 19 pages.
PCT/US2016/064030—International Search Report and Written Opinion, dated Feb. 24, 2017, 14 pages.
Combined Search Report and Examination Report correlating to GB1620779.7, dated May 19, 2017, 10 pages.

* cited by examiner

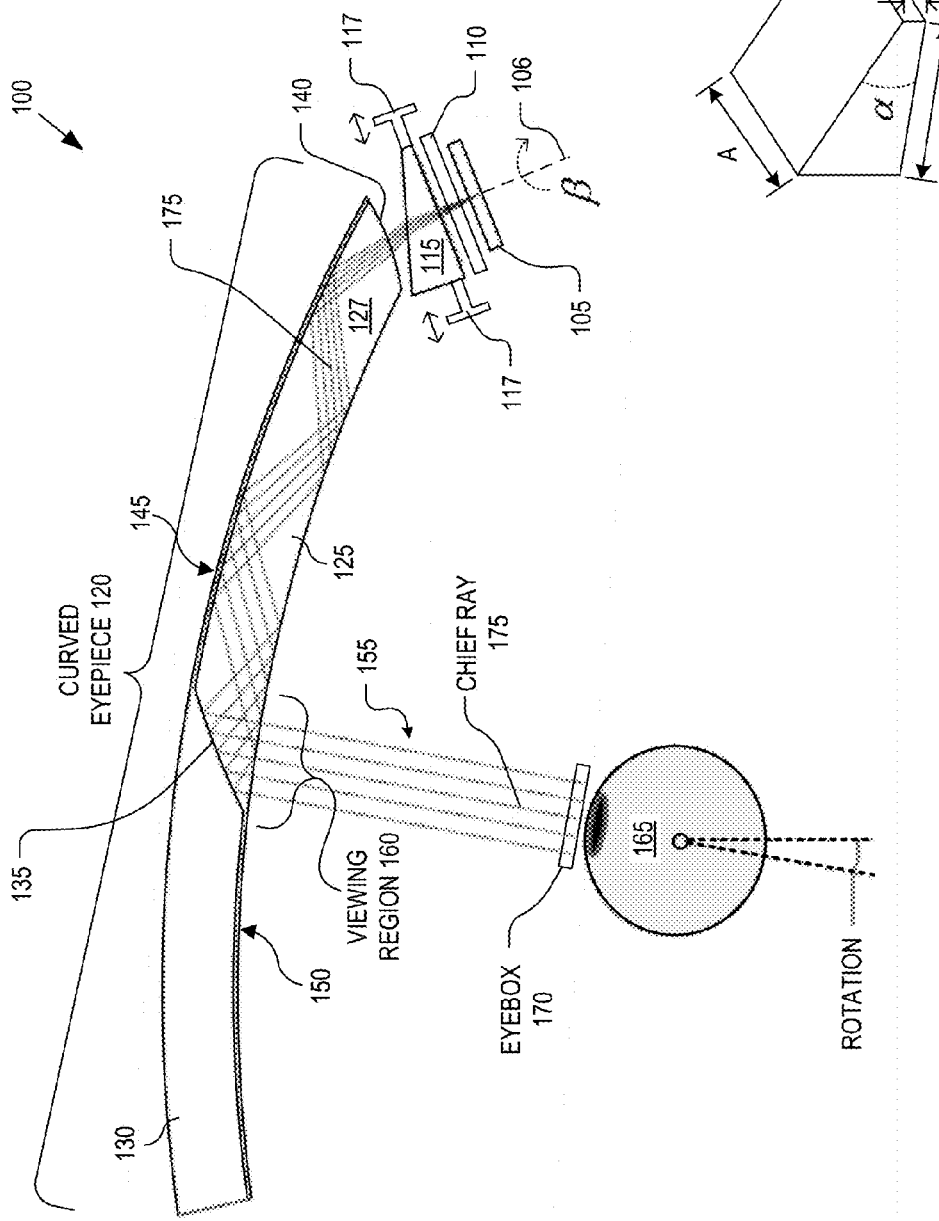
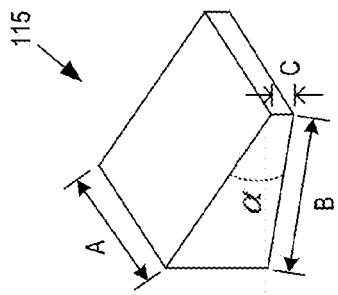
FIG. 1A
FIG. 1B $$sag(x,y) = \frac{(1/R)(x^2+y^2)}{1+\sqrt{1-(1/R^2)(x^2+y^2)}} + \sum C_{m,n}x^m y^n$$

$C_{2,0} = X2$ $C_{1,1} = X1Y1$ $C_{0,2} = Y2$ etc...

COEFFICIENTS TABLE

| Surface | R (mm) | Y2 | X3 | XY2 | X4 | X2Y2 | Y4 |
|---|---|---|---|---|---|---|---|
| S1 | -83.17 | 0 | 0 | 0 | 0 | 0 | 0 |
| S2 | -44.98 | 0.001688 | 0.0001044 | 1.247e-005 | 0 | 0 | 0 |
| S3 | -86.97 | 0 | 0 | 0 | 0 | 0 | 0 |
| S4 | 9.9 | -0.01178 | -0.0009546 | -0.003828 | -0.0005772 | -0.001333 | -0.0006253 |

COORDINATES TABLE

| Surface | X (mm) | Y (mm) | Z (mm) | α (deg) | β (deg) | γ (deg) |
|---|---|---|---|---|---|---|
| S1 | 0 | 0 | 0 | 0 | 0 | 0 |
| S2 | 4.99 | 0 | 1.83 | 0 | 26.75 | 0 |
| S3 | 0 | 0 | 3.8 | 0 | 0 | 0 |
| S4 | 34.6 | 0 | -3.95 | 0 | 35.67 | 0 | ically relates to head wearable displays.

CURVED EYEPIECE WITH COLOR CORRECTION FOR HEAD WEARABLE DISPLAY

TECHNICAL FIELD

This disclosure relates generally to the field of optics, and in particular, relates to head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, thickness, field of view, efficiency, and image quality of conventional optical systems used to implement existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 1A is a cross-sectional illustration of an optical system for use with a head wearable display, in accordance with an embodiment of the disclosure.

FIG. 1B is a perspective view illustration of a prism used within the optical system for compensation of lateral chromatic aberration, in accordance with an embodiment of the disclosure.

DETAILED DESCRIPTION

Figure 2A:
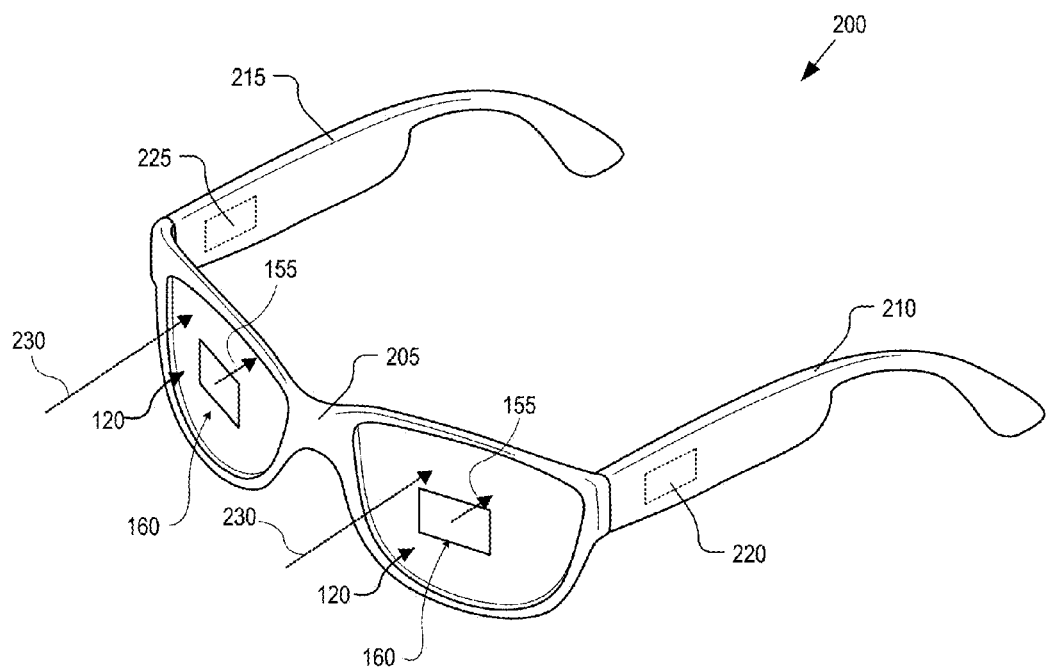
FIG. 2A is a perspective view illustration of head wearable display including a curved eyepiece, in accordance with an embodiment of the disclosure.

Embodiments of an apparatus, system and method of operation for a curved eyepiece with color correction are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1A is a cross-sectional illustration of an optical system 100 for use with a head wearable display, in accordance with an embodiment of the disclosure. The illustrated embodiment of optical system 100 includes a display panel 105, a polarization rotator 110, a prism 115, an adjustable mount 117, and a curved eyepiece 120. The illustrated embodiment of curved eyepiece 120 includes a first lens body 125, in which a curved lightguide 127 is disposed, a second lens body 130, an optical combiner 135, an input surface 140, a world facing surface 145, and an eye-ward facing surface 150.

Optical system 100 is well suited for use with head wearable displays having a near eye configuration. When integrated with a head wearable display, curved eyepiece 120 receives display light 155 generated by display panel 105 through an input surface 140 peripherally located from a viewing region 160 and emits display light 155 along an eye-ward direction in viewing region 160 toward a user's eye 165 within an eyebox 170. In one embodiment, display light 155 is guided within curved lightguide 127 by total internal reflection between input surface 140 and optical combiner 135. In other embodiments, angularly selective reflective coatings (e.g., multi-layer dichroic film stack) may be applied to promote reflections within curved lightguide 127 having sufficient obliqueness while transmitting near normal angles. In the illustrated embodiment, curved eyepiece 120 is see-through allowing the user to see ambient light incident through world facing surface 145.

During operation, display panel 105 generates display light 155 to form a display image (e.g., computer generated image). Display panel 105 may be implemented using a variety of display technologies including liquid crystal ("LC") displays, light emitting diode ("LED") displays, organic LED ("OLED") displays, LC on silicon ("LCoS") displays, or other micro display technologies.

In the illustrated embodiment, display light 155 is optionally directed through a polarization rotator 110. Polarization rotator 110 is orientated to align a linear polarization of display light 155 with a centerline of curved lightguide 127 to reduce asymmetries in birefringence (discussed in greater detail below). In one embodiment, polarization rotator 110 is a half-wave plate rotator with a specified angular rotation about a normal vector (axis 106) of the emission surface of display panel 105. The angular rotation of polarization rotator 110 is discussed below in connection with FIGS. 2B and 3B. In one embodiment, polarization rotator 110 includes a clear adhesive disposed across both sides to bond prism 115 to display panel 105.

Display light 155 is further directed through prism 115 prior to entering into curved lightguide 127. Prism 115 is disposed proximate to input surface 140 to pre-compensate display light 155 for lateral chromatic aberrations resulting from refractions entering and exiting curved lightguide 127. Lateral chromatic aberration is deleterious to image quality since it causes color components of a color image to separate or offset laterally. Prism 115 is designed to pre-compensate for this chromatic separation. In one demonstrative embodiment, prism 115 has the following characteristics and dimensions: refractive index=1.8, abbe number=29.9, A=5.6±0.1 mm, B=5.0±0.1 mm, C=0.91±0.1 mm, α=19.5°±0.15°. Of course, other dimensions and characteristics may be implemented.

In the illustrated embodiment, display panel 105 and prism 115 are orientated relative to curved eyepiece 120 such that chief rays 175 of display light 155 output from the pixels of display panel 105 are guided through curved lightguide 127 and directed substantially through the center of eyebox 170. Each pixel of display panel 105 has its own chief ray, which ideally, is the center normal ray projecting out from the given display pixel. Ideally, curved eyepiece 120 is designed such that the chief ray from each pixel passes through a center of eyebox 170 with each chief ray passing through the center at a different angle due to each pixel's different location on display panel 105. In other words, pixel location on display panel 105 is translated into a ray angle at eyebox 170. This ideal scenario provides improved luminance uniformity across eyebox 170. However, the ideal goal may not be achievable in practice. Accordingly, herein we define the chief ray 175 of a given pixel to be a ray emitted from display panel 105 within a cone having a three degree arc from normal (as measured from an emission surface of display panel 105) for that given pixel. This "chief ray" is close enough to normal for practical implementations. By orientating display panel 105 and prism 115 relative to curved lightguide 127 and designing curved lightguide 127 with appropriate geometries, the display image is perceived to have a high degree of uniform luminance when viewed from eyebox 170 when chief rays 175 pass substantially through a center of eyebox 170. The inclusion of prism 115 facilitates the reduction of the size of input surface 140 along with compensation of axial and lateral chromatic aberrations. In contrast, prism 115 could be omitted by tilting display panel 105 to a more oblique angle relative to input surface 140; however, doing so results in a larger input surface 140, which changes the end shape of curved eyepiece 120 near input surface 140 and reduces image brightness.

In the illustrated embodiment, prism 115 is positioned using adjustable mount 117. Adjustable mount 117 allows prism 115 to slide laterally relative to input surface 140 of curved eyepiece 120. Adjusting prism 115 changes the length of the optical path experienced by display light 155, thereby providing tunable focus. Adjustable mount 117 may be implemented as a one-time focusing apparatus for initial factory calibration. For example, adjustable mount 117 may be a sled or track on which prism 115 is physically slid. Clear adhesive may be applied and cured with UV exposure when an in-focus position is achieved. Alternatively, adjustable mount 117 may allow end user focus adjustments via mechanical or electromechanical adjustments. For example, adjustable mount 117 may be implemented as a microelectromechanical system ("MEMS"), a piezoelectric actuator, or various purely mechanical actuators (e.g., threaded screw adjustment or otherwise).

As display light 155 is guided through curved lightguide 127 from input surface 140 to viewing region 160, the curvature of curved lightguide 127 imparts optical power with each reflection or refraction. Curved eyepiece 120 imparts refractive optical power at input surface 140 and upon emission of display light 155 out eye-ward facing surface 150. Curved eyepiece 120 imparts reflective optical power via four total internal reflection interactions and one reflection off of optical combiner 135. The optical power interactions collectively serve to magnify the display image and displace the virtual image so that the user can bring the image into focus in a near-eye configuration.

Figure 5:
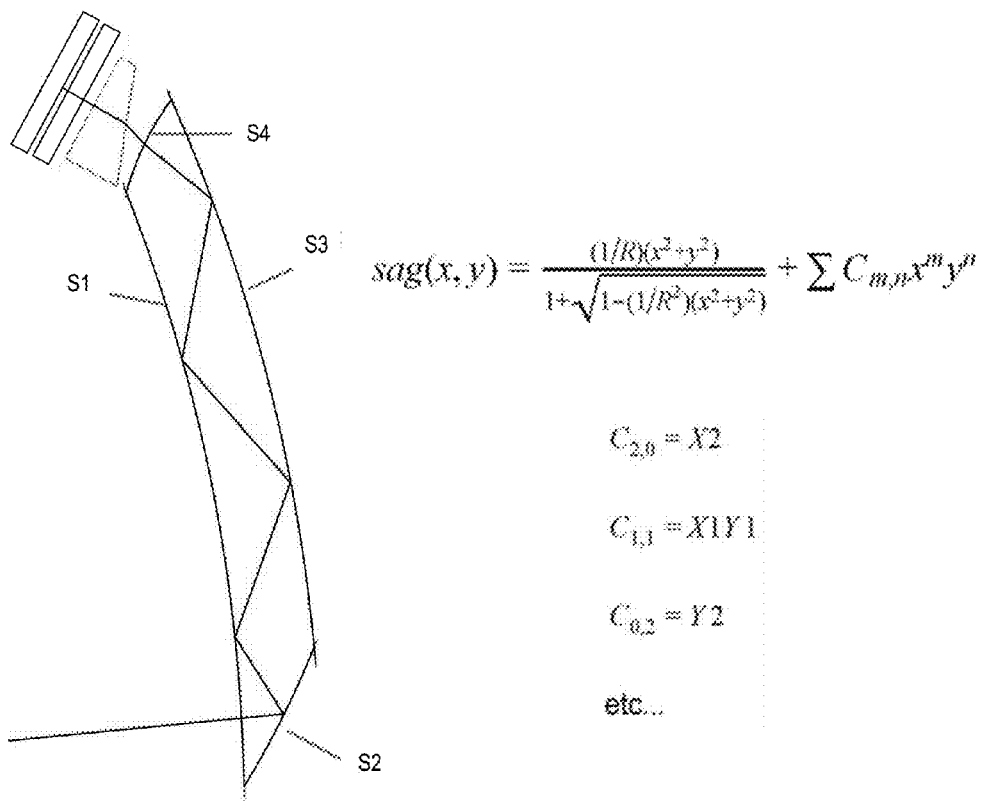
FIG. 5 provides a sag equation along with example coefficients for characterizing the surfaces of a demonstrative curved lightguide, in accordance with an embodiment of the disclosure.

FIG. 5 presents a sag equation with example coefficient values specifying example curvatures for the surfaces of curved lightguide 127 including: eye-ward facing surface 150 (S1), optical combiner surface 135 (S2), an outward facing surface (S3), and input surface 140 (S4). Surfaces S1-S4 all reside on lens body 125 and define curved lightguide 127. FIG. 5 also presents example coordinates for positioning surfaces S1 through S4. Of course, other curvatures, flat surfaces, and coordinates may be implemented. In particular, although the illustrated embodiments of surfaces S1 and S3 are described a spherical surfaces, in other embodiments, one or more of these surfaces may be described as a freeform surface, a rotationally symmetric asphere surface, an anamorphic asphere surface, a toroid surface, a Zernike polynomial surface, a radial basis function surface, an x-y polynomial surface, a non-uniform rational b-spline surface, or otherwise.

Returning to FIG. 1A, optical combiner 135 may be implemented using a variety of different structures that redirect display light 155 along an eye-ward direction. For example, optical combiner 135 may be a partial reflector, a beam splitter (e.g., thin silver coating, multilayer dielectric thin film, etc.), a polarization sensitive beam splitter ("PBS"), a semi-polarizing beam splitter, or otherwise. In one embodiment, optical combiner 135 is more transmissive to visible light than it is reflective. For example, optical combiner 135 may be implemented as 15% reflective and 85% transmissive. Of course, other reflective/transmissive ratios may be implemented. Accordingly, viewing region 160 is partially transmissive to ambient light incident through world facing surface 145 such that viewing region 160 is see-through.

Figure 2B:
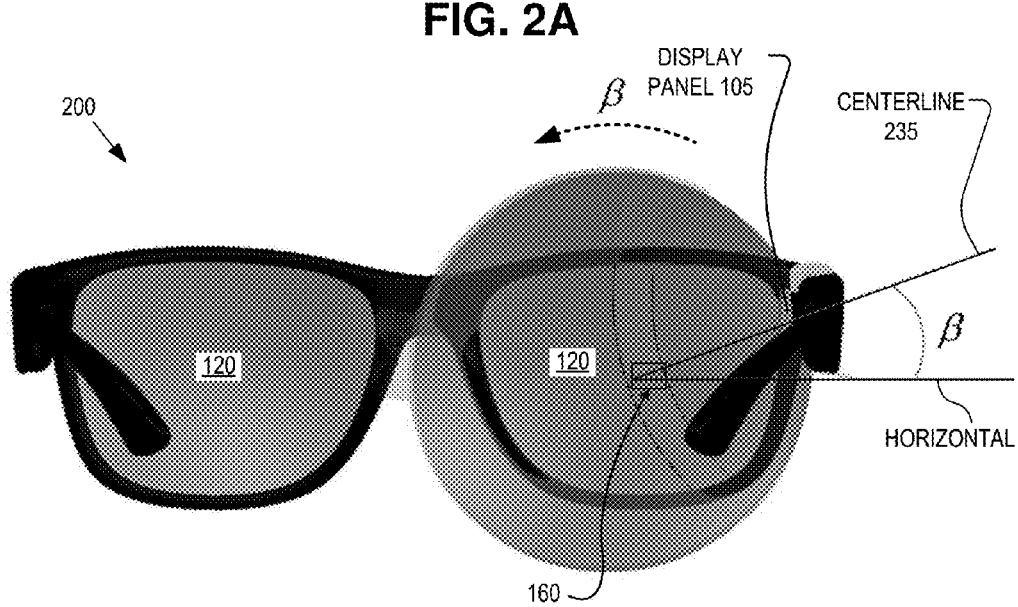
FIG. 2B is a side view illustration of a head wearable display showing how the centerline of the embedded curved lightguide is angled to position the display panel above the viewing region, in accordance with an embodiment of the disclosure.

FIGS. 2A and 2B are illustrations of a head wearable display 200 that incorporates a left and right instance of optical system 100, in accordance with an embodiment of the disclosure. FIG. 2A is a perspective view illustration of head wearable display 200 while FIG. 2B is a side view illustration of the same.

The illustrated embodiment of head wearable display 200 includes left and right instances of curved eyepieces 120.

Curved eyepieces 120 are mounted to a frame assembly, which includes a nose bridge 205, left ear arm 210, and right ear arm 215. Interior cavities 220 and 225 within left ear arm 210 and right ear arm 215 may contain various electronics including a microprocessor, interfaces, one or more wireless transceivers, a battery, a speaker, a controller, etc. In one embodiment, either of nose bridge 205 or the front facing corners of ear arms 210, 215 may contain a camera module for capturing forward facing images of the external scene or rear facing images of the user's eye(s). Although FIGS. 2A and 2B illustrate a binocular embodiment, head wearable display 200 may also be implemented as a monocular display with only one curved eyepiece 120 aligned with only a single user eye when worn.

Curved eyepieces 120 are edged to conform to the shape of the frame assembly and secured into an eye glass arrangement so head wearable display can be worn on the head of a user. The left and right ear arms 210 and 215 rest over the user's ears while nose bridge 205 rests over the user's nose. The frame assembly is shaped and sized to position viewing regions 160 (including optical combiners 135) in front of the user's eyes. In one embodiment, optical combiners 135 are positioned relative to the user's eyes such that the user looks slightly down (e.g., 7 degrees) and to the right or left (e.g., 15 degrees) to see the display image. Other angles may be implemented and other frame assemblies having other shapes may be used (e.g., a single contiguous headset member, a headband, goggles type eyewear, etc.). Optical combiners 135 within viewing regions 160 operate to redirect display light 155 to each eye while allowing ambient light 230 to pass through, thereby providing the user with an augmented view of the real-world.

FIG. 2B illustrates how curved eyepiece 120 is rotated by angle β (e.g., 18 degrees) to angle the embedded curved lightguide 127 (illustrated by a centerline 235) and position display panel 105 above viewing region 160, in accordance with an embodiment of the disclosure. Angling curved lightguide 127 to direct display light 155 along a downward trajectory towards viewing region 160 enables display panel 105 to be positioned in the user's upper temple region within ear arms 210 or 215, which can be advantageous from an industrial design perspective. However, when curved eyepiece 120 is rotated by angle β relative to level, the display image is also rotated by β and therefore not level. To counter-rotate the display image, display panel 105 is also rotated about axis 106 (see FIGS. 1 and 3A) by a complementary rotation of β, which offsets the rotational effects of rotating curved lightguide 127, as illustrated by centerline 235.

Figure 3A:
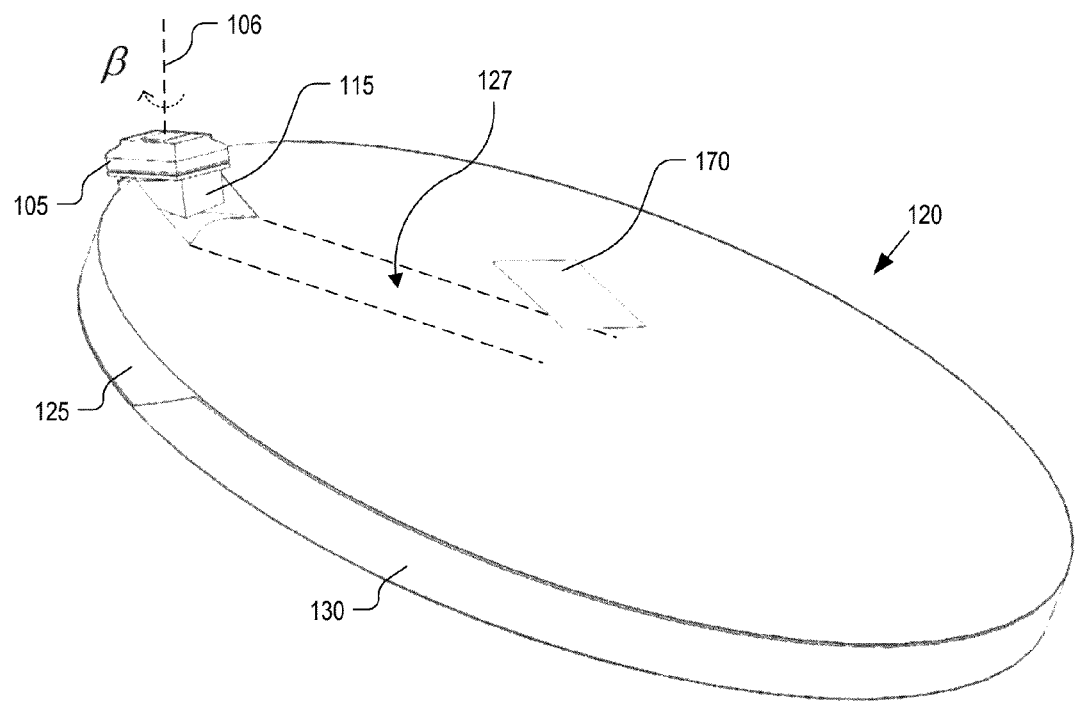
FIG. 3A is a perspective view illustration of the curved eyepiece and display panel, in accordance with an embodiment of the disclosure.
Figure 3B:
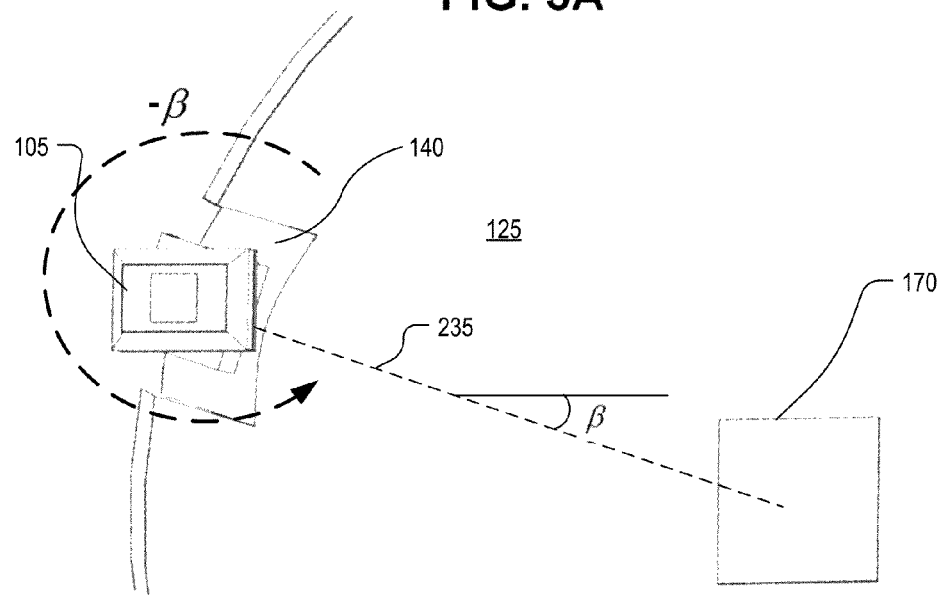
FIG. 3B is a close up illustration of the display panel and input surface of the curved eyepiece illustrating how the display panel is rotated by a complementary angle to offset rotation effects on the display light from rotation of the curved eyepiece, in accordance with an embodiment of the disclosure.

FIG. 3A is a perspective view illustration of curved eyepiece 120 and display panel 105, in accordance with an embodiment of the disclosure. FIG. 3B is a close up illustration of the same showing how display panel 105 is rotated by a complementary angle β to offset rotation effects on the display light from rotation of curved eyepiece 120 by β, in accordance with an embodiment of the disclosure. As illustrated, in FIG. 3B the counter-rotation of display panel 105 results in a level display image.

In one embodiment, a polarization rotator 110 (see FIG. 1A) is disposed in the optical path between display panel 105 and input surface 140. Polarization rotator 110 operates to align the linear polarization of display light 155 with the centerline 235 of curved lightguide 127. Centerline 235 represents an axis of symmetry down the center of curved lightguide 127. By aligning the linear polarization of display light 155 with this axis of symmetry, asymmetries in the polarization state caused by birefringence are reduced, thereby further improving the optical performance of the system. Polarization rotator 110 can also be used to align a linear polarization of display light 155 for improved reflection efficiency off of optical combiner 135. For example, polarization rotator 110 may be oriented such that display light 155 is incident upon optical combiner 135 substantially with only an s-polarization. S-polarization is linearly polarized light having an electric field that oscillates perpendicular to the plane of incidence with optical combiner 135. S-polarization light is the polarization that substantially reflects off of a polarized beam splitter, as compared to the p-polarization which substantially passes through a polarized beam splitter. In one embodiment, polarization rotator 110 is a half-wave plate rotator that is rotated by an angle equal to one half β about axis 106 relative to the plane of illustration in FIG. 1A. In one embodiment, polarization rotator 110 is a quarter-wave plate that converts linearly polarized light to circularly polarized light having substantially equal quantities of both linear polarizations with a 90 degree phase offset. Other rotations and polarization rotators may be selected to achieve the desired alignment to reduce the effects of birefringence on display light 155 as it propagates along curved lightguide 127 and/or to improve reflection efficiency off optical combiner 135. In embodiments where display panel 105 does not output polarized light and optical combiner 135 is not polarization sensitive, polarization rotator 110 may be omitted. However, non-polarized display panels currently available tend to be too large or not sufficiently bright. Similarly, non-polarized optical combiners that are approximately only 15% reflective tend to be more difficult to fabricate.

Figure 4B:
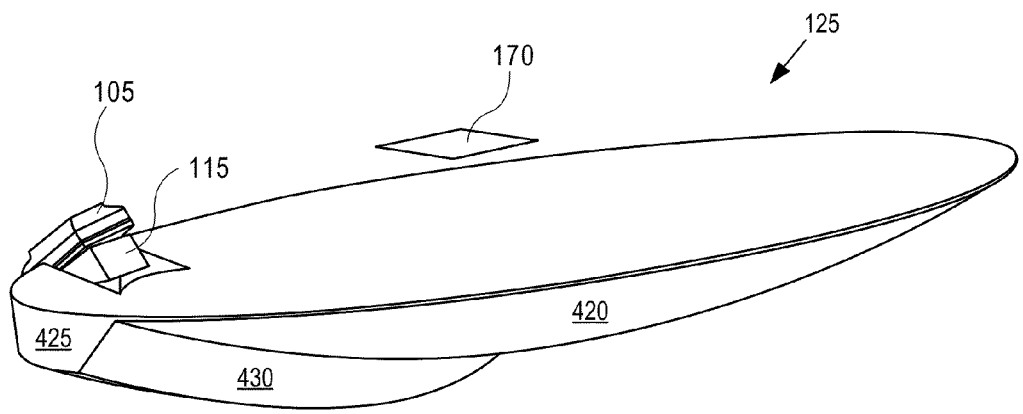
FIGS. 4A and 4B illustrate first and second lens bodies that mate together to form the curved eyepiece, in accordance with an embodiment of the disclosure.
Figure 4A:
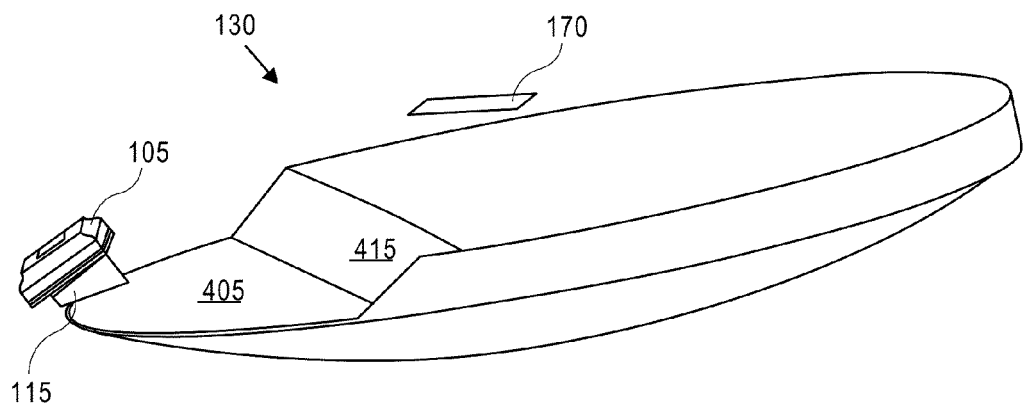

FIG. 3A further illustrates how curved eyepiece 120 is formed from two lens bodies 125 and 130 mated together. FIG. 4A illustrates an exploded view of just lens body 130 while FIG. 4B illustrates an exploded view of just lens body 125. As illustrated, lens body 130 includes a thin portion 405, a thick portion 410, and a transition surface 415 disposed at the transition between thin portion 405 and thick portion 410. Similarly, the illustrated embodiment of lens body 125 includes a thin portion 420, a thick portion 425, and a transition surface 430 disposed at the transition between thin portion 420 and thick portion 425. In one embodiment, lens body 125 is mated to lens body 130 using a clear adhesive having a refractive index that is less than the refractive index of lens bodies 125 and 130. The low index clear adhesive forms a total internal reflection boundary between the two lens bodies 125 and 130, which defines an interior boundary of curved lightguide 127 within thick portion 425 of lens body 125. Other coatings, such as an angle sensitive multi-layer dichroic coating may also be used. The viewing region 160 of curved lightguide 127 is defined by optical combiner 135 disposed at the junction between transition surfaces 415 and 430 when lens bodies 130 and 125 are mated together. Optical combiner 135 may be implemented as a partially reflective layer. In one embodiment, the partially reflective layer is a non-polarizing beam splitter coating. In one embodiment, the partially reflective layer is a polarizing beam splitter coating oriented to reflect polarized display light 155.

Curved eyepiece 120 is implemented as a thin, curved eyepiece having a thickness less than 8 mm, and in one embodiment is about 4.0 mm thick. In one embodiment, lens bodies 125 and 130 are formed of transparent optical grade plastic (e.g., polycarbonate, etc) having an index of refraction of 1.64. However, the higher the refractive index the thinner the curved eyepiece can be designed. A direct benefit of using higher index material is to reduce the angle at which TIR occurs. This effectively enables designs that reduce the angle of the output coupler, which can either increase the size of the eyebox for a given lightguide thickness or reduce the overall thickness of the lightguide for a given eyebox size. Using higher index material for the curved eyepiece can also provide greater flexibility in the refractive index of the optical grade adhesives used to bond the lens bodies 125 and 130 together. The curvatures of both eye-ward facing surface 150 and world-facing surface 145 may be implemented as spherical surfaces. Collectively, the curvature and slim nature of curved eyepiece 120 provide a desirable industrial design. Curved eyepiece 120 not only has desirable industrial design, but is also efficient since ideally the only lossy bounce for display light 155 traveling from input surface 140 to optical combiner 135 is the single redirection by optical combiner 135 itself. This permits optical combiner 135 and viewing region 160 to be substantially more transmissive than reflective thereby improving the see-through characteristic of curved eyepiece 120 in viewing region 160.

In the illustrated embodiment, world facing surface 145 provides a complementary curvature to offset the optical power of the curvature of eye-ward facing surface 150 encountered by ambient light 230. Furthermore, in one embodiment, lens bodies 125 and 130 are fabricated of the same transparent materials or transparent materials having substantially the same index of refraction. Thus, curved eyepiece 120 operates as a see-through display, which combines ambient light 230 with display light 155 directed out viewing region 160 along an eye-ward direction into eye 165. In this way, curved eyepiece 120 is capable of displaying an augmented reality to eye 165; however, the combined curvatures of world facing surface 145 and eye-ward facing surface 150 of curved eyepiece 120 complement each other and collectively do not impart lensing power to ambient light 230 as it passes through curved eyepiece 120 in viewing region 160. In other embodiments, the curvatures of world facing surface 145 and eye-ward facing surface 150 may be unbalanced to impart prescriptive lensing to ambient light 230.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for use with a head wearable display, the apparatus comprising:
    a curved eyepiece for guiding display light received at an input surface peripherally located from a viewing region and emitting the display light along an eye-ward direction in the viewing region, the curved eyepiece including:
        a curved lightguide to guide the display light via total internal reflections from the input surface to the viewing region;
        an eye-ward facing surface that is concave;
        a world facing surface that is convex and opposite the eye-ward facing surface; and
        an optical combiner disposed at the viewing region to redirect the display light towards the eye-ward direction for output from the curved lightguide, wherein the optical combiner is partially transmissive to ambient light incident through the world facing surface such that the viewing region is see-through; and
    a prism disposed proximate to the input surface to pre-compensate the display light, prior to passing through the input surface, for lateral chromatic aberrations resulting from the curved lightguide.

2. The apparatus of claim 1, further comprising:
    a display panel to generate the display light and disposed proximate to the prism to emit the display light through the prism towards the input surface, wherein the display panel is aligned relative to the curved lightguide such that a normal ray of an image light output from a given pixel on the display panel is directed substantially through a center of an eyebox of the head wearable display.

3. The apparatus of claim 2, wherein the input surface extends between and directly interfaces with the eye-ward facing surface and the world facing surface, wherein the input surface, the eye-ward facing surface, and the world facing surface are all continuous surfaces without discontinuities in their curvatures.

4. The apparatus of claim 2, further comprising:
    a frame assembly to support the curved eyepiece, the display panel, and the prism for wearing on a head of a user with the viewing region positioned in front of an eye of the user,
    wherein the curved eyepiece is rotated by a first angle to position the display panel above the viewing region, and
    wherein a centerline of the curved lightguide extending from the input surface to the optical combiner aligns with the first angle.

5. The apparatus of claim 4, wherein the display panel is rotated by a second angle complementary to the first angle to offset rotational effects from the rotation of the first angle on the display light output from the curved eyepiece.

6. The apparatus of claim 4, further comprising:
    a polarization rotator disposed between the display panel and the input surface to rotate a linear polarization of the display light for alignment relative to the centerline of the curved lightguide to reduce asymmetries in polarization state caused by birefringence.

7. The apparatus of claim 1, further comprising:
    a polarization rotator disposed between the display panel and the input surface to rotate a linear polarization of the display light for alignment relative to the optical combiner such that the linear polarization of the display light has substantially only an s-polarization upon incidence on the optical combiner.

8. The apparatus of claim 1, wherein the curved eyepiece further comprises:
    a first lens body having a first thick portion, a first thin portion, and a first transition surface between the first thick portion and the first thin portion;
    a second lens body having a second thick portion, a second thin portion, and a second transition surface between the second thick portion and the second thin portion, wherein the first thick portion mates to the second thin portion and the first transition surface mates to the second transition surface, and wherein the curved lightguide is disposed within the first thick portion, and wherein the optical combiner is disposed between the first transition surface and the second transition surface.

9. The apparatus of claim 8, wherein a clear adhesive having a first index of refraction that is less than a second index of refraction of the first lens body and the second lens body bonds the first thick portion to the second thin portion to establish a total internal reflection boundary between the first lens body and the second lens body.

10. The apparatus of claim 8, wherein the optical combiner comprises one of a non-polarizing beam splitter coating, a semi-polarizing beam splitter, or a polarizing beam splitter coating oriented to reflect polarized display light.

11. A head wearable display, comprising:
a display panel to generate display light that is received at an input surface peripherally located from a viewing region;
a curved eyepiece for guiding the display light to a viewing region offset from the peripheral location and emitting the display light along an eye-ward direction in the viewing region, the curved eyepiece including:
  a curved lightguide to guide the display light via total internal reflections from the input surface to the viewing region;
  an eye-ward facing surface that is concave;
  a world facing surface that is convex and opposite the eye-ward facing surface; and
  an optical combiner disposed at the viewing region to redirect the display light towards the eye-ward direction for output from the curved lightguide, wherein the optical combiner is partially transmissive to ambient light incident through the world facing surface such that the viewing region is see-through;
a frame assembly to support the curved eyepiece and the display panel for wearing on a head of a user with the viewing region positioned in front of an eye of the user,
wherein the display panel is aligned relative to the curved lightguide such that a ray that is within three degrees of normal to the display panel, of an image light output from a given pixel on the display panel is directed substantially through a center of an eyebox of the head wearable display; and
a prism disposed proximate to the input surface to precompensate the display light, prior to passing through the input surface, for lateral chromatic aberrations resulting from the curved lightguide.

12. The head wearable display of claim 11, wherein the input surface extends between and directly interfaces with the eye-ward facing surface and the world facing surface, wherein the input surface, the eye-ward facing surface, and the world facing surface are all continuous surfaces without discontinuities in their curvatures.

13. The head wearable display of claim 11, wherein the curved eyepiece is rotated within the frame assembly by a first angle relative to horizontal to position the display panel above the viewing region, and wherein a centerline of the curved lightguide extending from the input surface to the optical combiner aligns with the first angle.

14. The head wearable display of claim 13, wherein the display panel is rotated by a second angle complementary to the first angle to offset rotational effects from a rotation of the first angle on the display light output from the curved eyepiece.

15. The head wearable display of claim 13, further comprising:
a polarization rotator disposed between the display panel and the input surface to rotate a linear polarization of the display light for alignment relative to the centerline of the curved lightguide to reduce asymmetries in birefringence.

16. The head wearable display of claim 15, wherein the polarization rotator comprises a half-wave plate rotator that is rotated by a third angle equal to half the first angle.

17. The head wearable display of claim 11, wherein the curved eyepiece further comprises:
a first lens body having a first thick portion, a first thin portion, and a first transition surface between the first thick portion and the first thin portion;
a second lens body having a second thick portion, a second thin portion, and a second transition surface between the second thick portion and the second thin portion,
wherein the first thick portion mates to the second thin portion and the first transition surface mates to the second transition surface,
wherein the curved lightguide is disposed within the first thick portion, and
wherein the optical combiner is disposed between the first transition surface and the second transition surface.

18. The head wearable display of claim 17, wherein a clear adhesive having a first index of refraction that is less than a second index of refraction of the first lens body and the second lens body bonds the first thick portion to the second thin portion to establish a total internal reflection boundary between the first lens body and the second lens body.

* * * * *